United States Patent
Assouad

[19]

[11] Patent Number: 6,084,739
[45] Date of Patent: *Jul. 4, 2000

[54] WRITE SYNCHRONIZATION SYSTEM ON A HEADERLESS FORMAT MAGNETIC DISK DEVICE

[75] Inventor: Nicolas C. Assouad, Niwot, Colo.

[73] Assignee: Adaptec, Inc., Milpitas, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/829,432

[22] Filed: Mar. 31, 1997

[51] Int. Cl.[7] .............................. G11B 5/596; G11B 5/09
[52] U.S. Cl. ............................ 360/77.08; 360/48; 360/51
[58] Field of Search ............................. 360/48, 51, 77.08

[56] References Cited

U.S. PATENT DOCUMENTS

| 5,523,903 | 6/1996 | Hetzler et al. | 360/51 |
| 5,801,896 | 9/1998 | Freitas | 360/77.08 |
| 5,802,584 | 9/1998 | Kool et al. | 360/77.08 |

OTHER PUBLICATIONS

Abstract of JP 61221842, Ueda, Toshiharu, Oct. 1986.

*Primary Examiner*—Paul Loomis
*Assistant Examiner*—Regina Y. Neal
*Attorney, Agent, or Firm*—Duft, Graziano & Forest, P.C.

[57] ABSTRACT

A write synchronization system in a headerless format magnetic disk device. The system transmits encoded synchronization signals containing disk administration information such as servo burst information between a servo controller and other disk controller components such as a hard disk controller and a microprocessor or digital signal processor. The servo controller interprets the disk administration information read from the magnetic disk and sends an encoded signal to the other disk controller components for each servo burst encountered on when reading the disk. The disk administration information in the signals can be verified by comparing the contents of a present signal to the contents of at least one previous signal to determine if a servo burst from a sequence of servo bursts has been missed. A missing servo burst can also be identified by measuring the time interval between signals from the servo controller.

9 Claims, 5 Drawing Sheets

WRITE SYNCHRONIZATION SYSTEM ON A HEADERLESS FORMAT MAGNETIC DISK DEVICE

FIELD OF THE INVENTION

This invention relates to the field of magnetic disk devices, and in particular to a write synchronization system for disk controller components of a magnetic disk having a headerless disk format.

PROBLEM

A specific point on the concentric tracks of a magnetic disk is identified by a unique address that typically includes a cylinder number, a head number, and a data sector number. The cylinder and head portion of the address identify a specific track on the magnetic disk and the data sector portion of the address identifies a specific data sector on the track.

To help position a read/write head over a specific point on the magnetic disk that is identified by a target address, special markers called servo bursts are located at regularly spaced intervals throughout the recording surface of the magnetic disk. The servo bursts each contain a cylinder, head, and servo burst number that are read and interpreted by disk controller components in the magnetic disk device to orient the read/write heads so that a specific data sector identified by the target address can be determined.

In historic magnetic disk devices that included headers in their disk format for each data sector, a specific data sector location was determined by the address information in each data sector's header. Today, magnetic disk devices operate with a headerless disk format that requires a calculation to determine the location of a specific data sector once the servo bursts have oriented the read/write heads.

Because there are a fixed number of bytes in a data sector and there are a fixed number of bytes between servo bursts on a given track, the exact location of a target data sector can be calculated once the track is located.

One problem with locating a specific data sector in a headerless disk format is that individual ones of the disk controller components can become out of synchronization with the rest of the disk controller components which can result in the corruption of data stored on the disk. Key disk controller components in a magnetic disk device includes, but are not limited to, a microprocessor or Digital Signal Processor (DSP), a servo controller, and a hard disk controller. The microprocessor or DSP oversees all disk control component activities including read/write operations. The servo controller controls read/write head positioning based on servo burst information read from the disk. The hard disk controller caches the data being written to and read from the disk.

One reason the disk controller components can become out of synchronization is because the hard disk controller relies on the servo controller to send it a signal pulse to note each occurrence of a servo burst encountered by the read/write heads. The hard disk controller counts each signal pulse received from the servo controller and coordinates the retrieval of at least one indexed set of cached data from a data cache to write to the disk in response to the signal pulses. However, the servo controller can inadvertently skip reading a servo burst due to interruptions such as a hard or soft fault or timeout, or due to extraneous noise or a momentary misalignment between the read/write heads and the track being read. Although the servo controller can reorient itself by reading the next servo burst, the hard disk controller has no idea that a servo burst was missed even if the servo controller is reoriented. The result is that data is written to the wrong data sector on the disk and the disk is corrupted.

Further complicating the scenario is that the microprocessor or DSP is instructing the hard disk controller which set of cached data to write out for a given write request in concert with the signal pulses the microprocessor or DSP is receiving from the servo controller. Once again the microprocessor or DSP has no way of knowing if the servo controller has missed a servo burst and the result is that the microprocessor or DSP can mistakenly instruct the hard disk controller to retrieve the wrong data from the data cache to write to the disk. The result is that the wrong data is written to the wrong data sector on the disk and the disk is corrupted.

For the above stated reasons, there is a need for a synchronization system to coordinate disk controller components during read/write operations in a disk device having a headerless disk format. The synchronization system must ensure that data can be reliably written to the disk without the risk of data corruption due to a synchronization lapse. A solution to this problem has heretofore not been known prior to the present invention as disclosed and claimed herein.

SOLUTION

The above identified problems are solved and an advancement achieved in the field due to the write synchronization system for a disk device having a headerless disk format. The write synchronization system coordinates the disk controller components so that each disk controller component has the same servo burst information as the servo controller.

In one embodiment, the write synchronization system includes establishing a communication link from the servo controller to the hard disk controller and microprocessor or DSP respectively. The servo controller reads the servo burst information from each servo burst encountered by the read/write heads. The servo burst information includes, but is not limited to, a servo burst address such as the cylinder, head, and servo burst number. The at least one portion of the servo burst address is encoded and distributed to the disk controller components including the hard disk controller and the microprocessor or DSP. The encoded signal can be decoded by the receiving disk controller components. By comparing the contents of a present decoded signal content with the contents of at least one previously decoded signal, each signal received from the servo controller can be verified and determination made as to whether a servo burst has been missed. The signal encoding can be any type of binary code. The encoded signal carrier can be any combination of frequency modulation and/or phase modification that distinguishes the individual digits of the binary code.

In another embodiment, disk controller components can determine that a servo burst has been missed regardless of the contents of the signal received from the servo controller, based on the time interval between signals received from the servo controller. Because the servo bursts on a disk are axially aligned at regular intervals on the disk, the time interval between any two servo bursts is a constant. Depending on the sophistication of the timer, a determination can be made that at least one servo burst has been missed or that a specific number of servo bursts have been missed. Although the disk controller components that receive the signal pulse from the servo controller do not know which servo burst has been missed without looking at the contents of the signal, the disk controller components can be certain that resynchronization is necessary because the time interval indicates that at least one servo burst has been missed.

DETAILED DESCRIPTION

Figure 1:
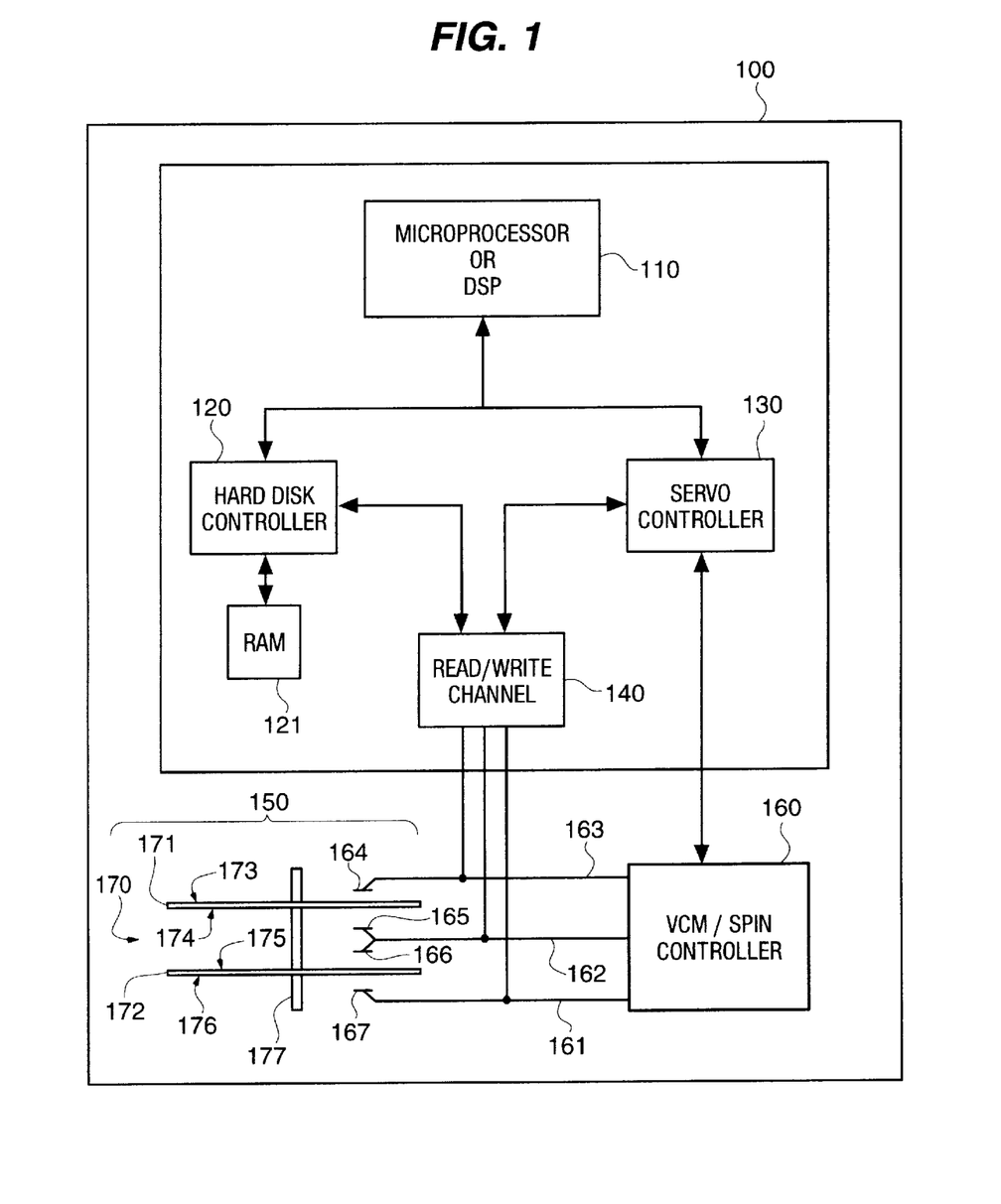
FIG. 1 illustrates a system level view of a magnetic disk device component architecture in block diagram form.

Magnetic Disk Device Architecture—FIG. 1

FIG. 1 illustrates a system level architecture view of a magnetic disk device 100 in block diagram form. The primary components in magnetic disk device 100 include, but are not limited to, disk control components 110–140 and operational disk components 150–160. Disk control components 110–140 include, but are not limited to, a microprocessor or Digital Signal Processor (DSP) 110, a hard disk controller 120 with accompanying RAM 121, a servo controller 130, and a read/write channel controller 140. The microprocessor or DSP 110 is the highest level of control and coordination for all disk device activities and read/write operations executed by the disk control components. Hard disk controller 120 manages and caches all data being written to and/or read from the magnetic disk 170. RAM 121 is used as a data cache in addition to table storage for disk related information such as split data sector information and/or defective data sector information as is done in conventional magnetic disk devices. The servo controller 130 interprets servo burst information and controls positioning activities of read/write heads. Read/write channel 140 passes data to and from the various disk control components 110–130 for each read/write operation.

Operational disk components 150–160 include, but are not limited to, a Head and Disk Assembly (HDA) 150 that includes magnetic disk 170 and read/write heads 164–167, and Voice Coil Motor (VCM)/spin controller 160 that is operatively connected to access arms 161–163. Magnetic disk 170 is comprised of one or more platters 171–172. Each platter has at least one and typically two magnetic recording surfaces as illustrated for the first and second surfaces 173–174 and 175–176 of platters 171–172 respectively. Each of the platters 171–172 of a multiple platter magnetic disk 170 are rigidly fixed to a spindle 177 along a common central axis. VCM/spin controller 160 manages the appropriate physical movements of the access arms 161–163. Read/write heads 164–167 are positioned to fly just off the recording surfaces 173–176 respectively when the magnetic disk 170 is spinning. Although other magnetic disk device architectures are possible other than the architecture described above, no limitation is intended or implied with respect to the present invention. The present invention is applicable to any headerless format magnetic or optical disk regardless of a single platter or multiple platter implementation or a removable medium or floppy disk medium.

Figure 2:
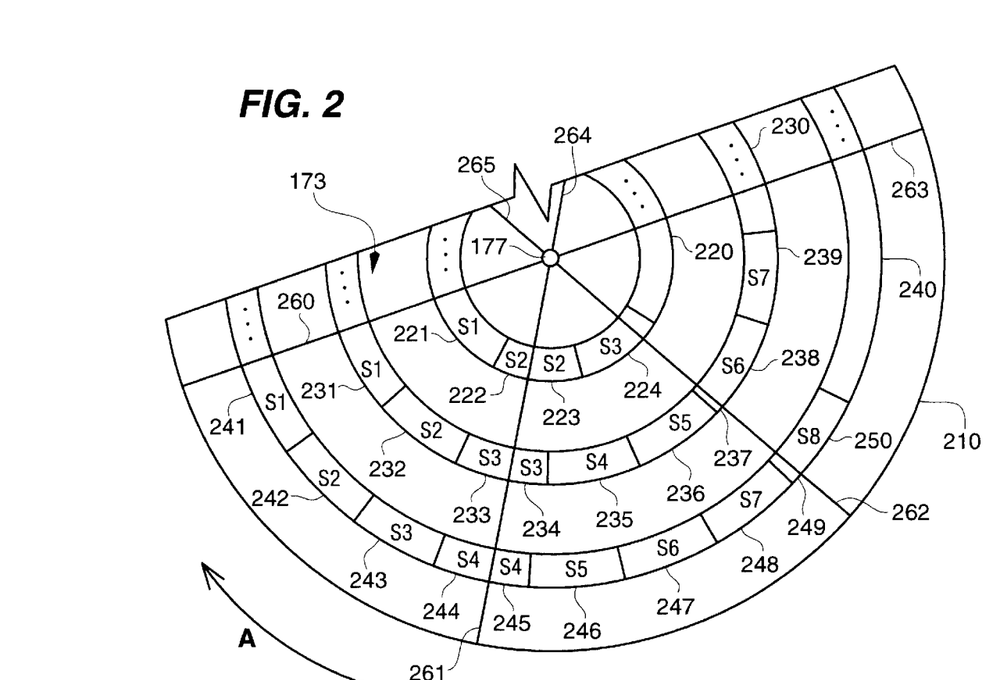
FIG. 2 illustrates an top view of a track and sector format on a magnetic disk device recording surface.
Figure 3:
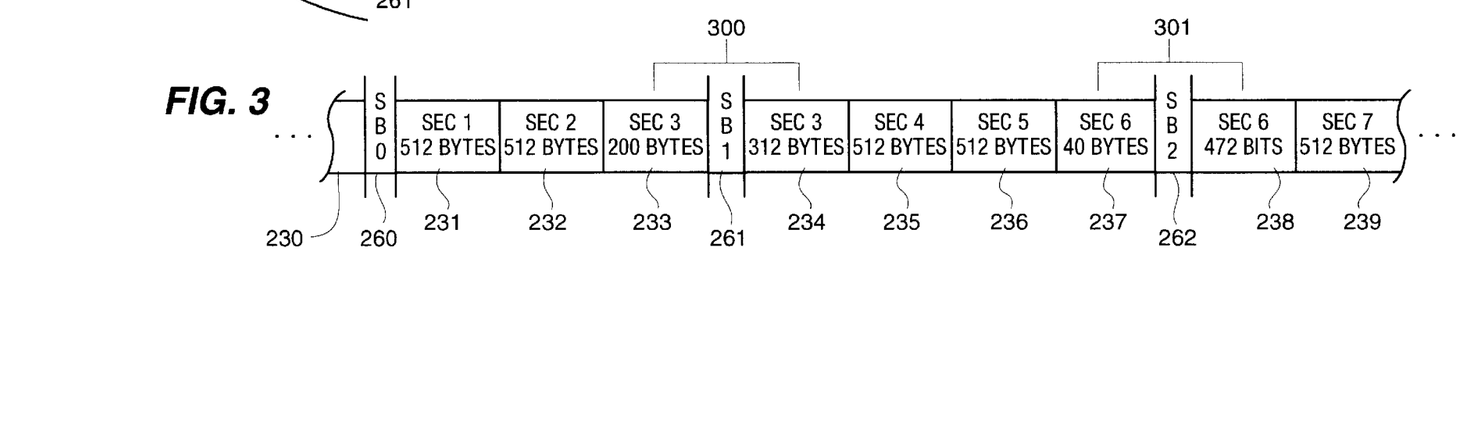
FIG. 3 illustrates detailed views of a track and sector format in block diagram form.

Magnetic Disk Format—FIGS. 2–3

FIG. 2 illustrates the track and sector format for a recording surface such as recording surface 173 of magnetic disk 170. Recording surface 173 comprises a plurality of concentric tracks of successively increasing size from the center spindle 177 to the outer edge 210. The present illustration focuses on tracks 220, 230, and 240. A cylinder is the set of all tracks of a given size from each recording surface of each platter in magnetic disk 170. Thus, if track 230 is the 6th concentric track of recording surface 173 and each recording surface of magnetic disk 170 has a 6th concentric track, then there exists a 6th cylinder for magnetic disk 170 that comprises each 6th concentric track of each recording surface. With a single motion of access arms 161–163, each read/write head 164–167 can be simultaneously positioned to read and/or write data from any one or more of the recording surfaces 173–176 in cylinder 6. If track 230 is the 6th track and read/write heads 164–167 are numbered 00 through 03 respectively, then the cylinder CC and head HH address for track 230 on recording surface 173 would be "0600".

Each track on each recording surface such as recording surface 173 is overlaid with regularly spaced and radially aligned servo burst markings 260–265. Each servo burst that resides on each track contains, among other things, specific cylinder, head, and servo burst number information that uniquely identifies the location of each servo burst. For purposes of the present illustration, servo bursts 260–265 are numbered 0–5 respectively.

Data sectors, also known as sectors, blocks, or records, are fixed length addressable subdivisions of a track that typically contain customer data. For example, a typical sector size might be 512 bytes long. To simplify the present discussion, the data sectors 221, 231, and 241 are identified as sector number 1 and each begins on an even full sector boundary from servo burst 260. A given track, however, does not always begin with data sector number 1 at servo burst number 0 for reasons beyond the scope of this discussion.

FIG. 3 illustrates a segment of track 230 that includes servo bursts 260–262 and data sectors 231–239. Specifically, data sectors 231–232, 235–236, and 239 are shown as being full data sectors of 512 bytes each for example purposes. Split data sector 300 contains a leading or first data sector segment 233 having 20 bytes and a trailing or second data sector segment 234 having the remaining 312 bytes of an otherwise full 512 byte data sector. Similarly, split data sector 301 contains a leading or first data sector segment 237 having 40 bytes and a trailing or second data sector segment 238 having the remaining 472 bytes of an otherwise full 512 byte data sector.

Figure 4:
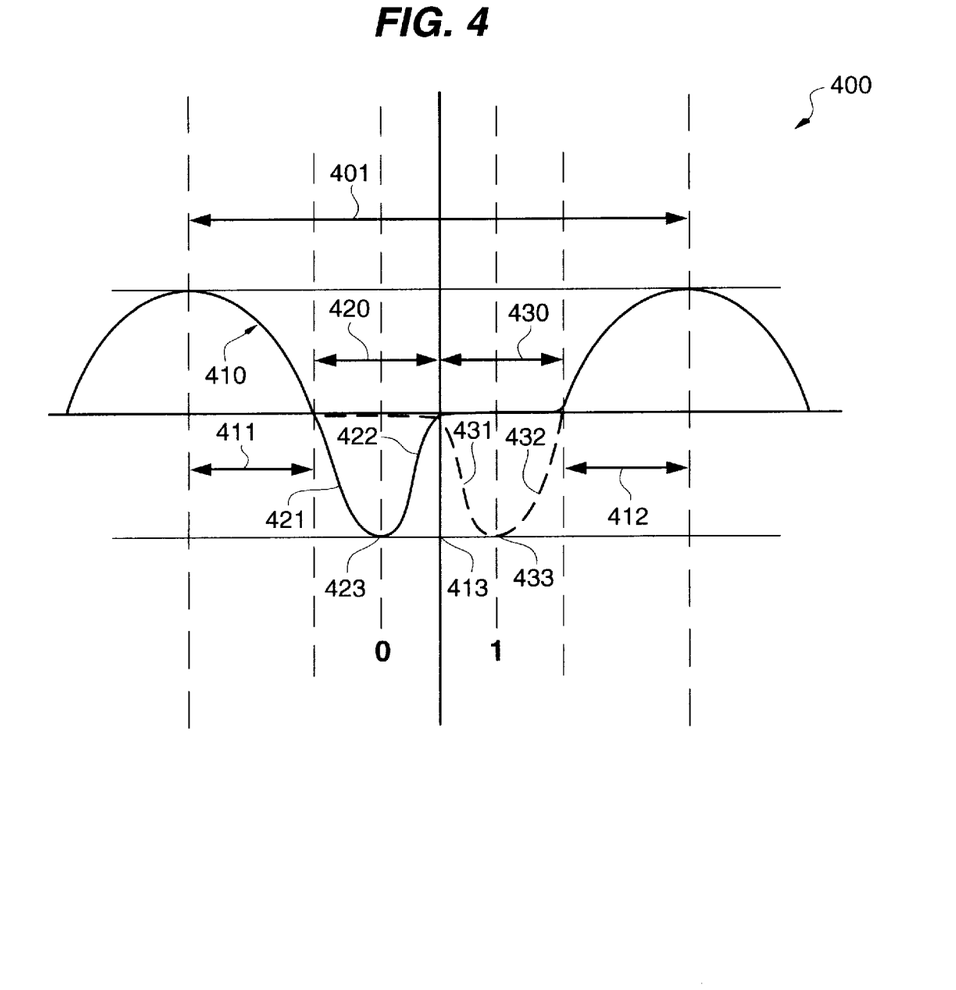
FIG. 4 illustrates an example of a phase encoded signal profile.
Figure 5:
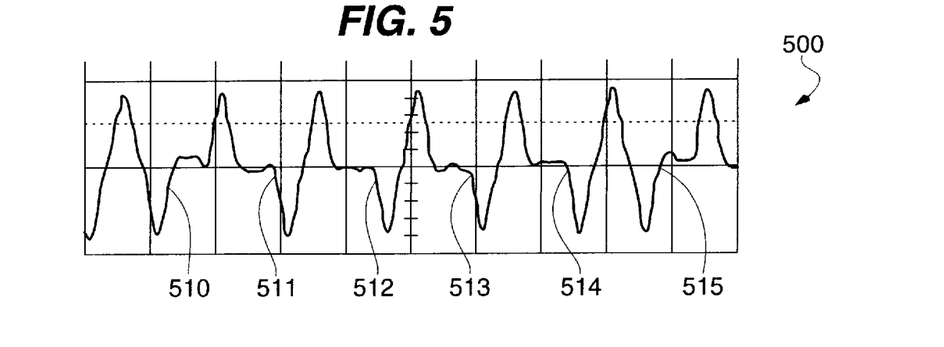
FIG. 5 illustrates an example of a series of phase encoded signals.

Signal Pulse Encoding—FIG. 4–5

The write synchronization system of the present invention coordinates the disk controller components of the disk device so that each component has the same basic servo burst information as the servo controller. The write synchronization system includes establishing a communication link from the servo controller to the hard disk controller and microprocessor or DSP respectively. The servo controller reads the servo burst information from each servo burst encountered by the read/write heads. Servo burst information includes, but is not limited to, a servo burst address such as the cylinder, head, and servo burst number. At least one portion of the servo burst address is encoded and distributed to the disk controller components including the hard disk controller and the microprocessor or DSP. The portion of the servo burst address that is most useful in a minimum sized encoded signal is the servo burst number.

The encoded signal can be individually decoded by the receiving disk controller components and compared to previously received signals for validation purposes. By comparing the contents of a present decoded signal content with the contents of at least one previously decoded signal, each signal received from the servo controller can be verified and determination made as to whether a servo burst has been missed. For example, if the present servo burst number in the present encoded signal received by the hard disk controller is number 5, and the servo burst numbers in the two most recently received encoded signals prior to the present signal are numbers 2 and 3 respectively, then servo burst 4 was missed and the disk controller components are out of synchronization unless steps are taken to resynchronize the disk controller components.

The encoding of the contents of the signals sent from the servo controller can be any of a variety of binary code types that are well known in the industry. The size of each encoded signal depends on whether the entire cylinder, head, and servo burst number is encoded, or whether only a minimal amount of information is encoded such as only the servo burst number. The signal itself can carry the encoding in any combination of frequency modulations and/or phase modifications provided that the individual digits of the binary code are distinguishable.

FIG. 4 illustrates an example of a phase encoded signal profile 400 for a single cycle 401 of a phase encoded signal 410. Negative edge 411 and positive edge 412 remain substantially consistent from one cycle to the next and for this reason are not of particular significance in the phase encoding. Absent any encoding at all, the most negative point of an unencoded signal would occur at or about point 413. By phase encoding the signal, the most negative point of the encoded signal is phase shifted to occur at either point 423 or 433 as a binary indicia. For example, a negative edge 421 and positive edge 422 occurring within interval 420 and a substantially flat edge occurring within interval 430 can indicate a binary digit 0. Similarly, a substantially flat edge occurring withing interval 420 and a negative edge 431 and positive edge 432 occurring within interval 430 can indicate a binary digit 1. A contiguous set of phase encoded binary indicia can represent an entire cylinder, head, and servo burst number address or only the servo burst number of a servo burst encountered by the read/write heads on the disk. FIG. 5 illustrates an example of a phase encoded signal 500 as the signal would appear for the binary digits "011110" over six cycles 510–515. Other types of encoding are also applicable to the present invention and are considered within the scope of the present invention. No limitation on the type of encoding is intended based on the FIG. 4 and 5 examples.

Figure 6:
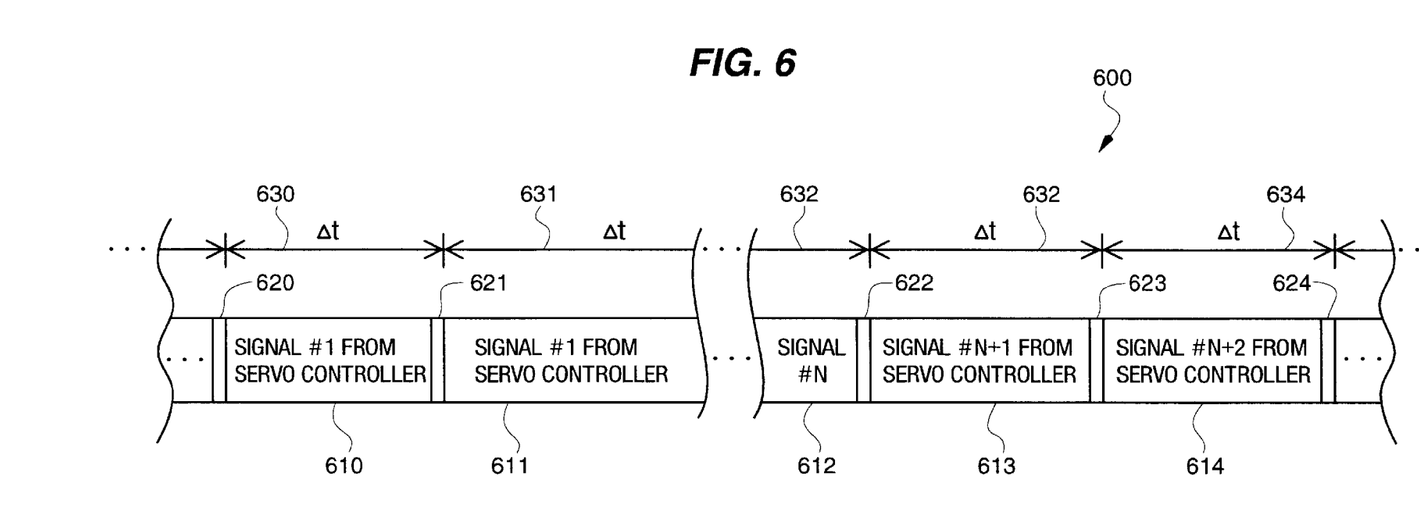
FIG. 6 illustrates servo burst time intervals in block diagram form.

Servo Burst Interval Timing—FIG. 6

An additional interval timing verification of the signal sent from the servo controller to other disk controller components can be used independent of the previously disclosed signal encoding or in combination with the previously disclosed signal encoding. The interval timing verification ignores the content of the signal sent by the servo controller and focuses on the time interval between signals received from the servo controller. Because the servo bursts on a disk are axially aligned at regular intervals on the disk, the time interval between any two servo bursts is a constant. Thus, if the interval between signals sent by the servo controller is beyond an expected time interval, then the servo controller missed a servo burst.

Depending on the sophistication of the interval timer, a determination can be made that at least one servo burst has been missed or that a specific number of servo bursts greater than one has been missed. Although the disk controller components that receive the signal pulse from the servo controller do not know which servo burst has been missed without looking at the contents of the signal, the disk controller components can be certain that at least one servo burst was missed and disk controller component resynchronization is necessary.

FIG. 6 illustrates an example of an interval timing diagram for a stream of signals 600 sent from the servo controller to other disk controller components. Each signal 610–614 in signal stream 600 contains binary encoded information indicative of individual ones of a series of servo bursts. Each signal 610–614 occurs within a fixed time interval t as indicated by time intervals 630–634. Any time interval greater than t indicates that the servo controller missed a servo burst. Any time interval that is a multiple of t indicates that the servo controller has missed more than one servo burst.

Optionally, to distinguish the beginning and/or end of any given signal 610–614, a brief separator signal 620–624 can be used. As a further alternative, the absence of a specific signal 610–614 can be noted by a different frequency or a repeated pattern that is distinguishable from the signals 610–614.

Figure 7:
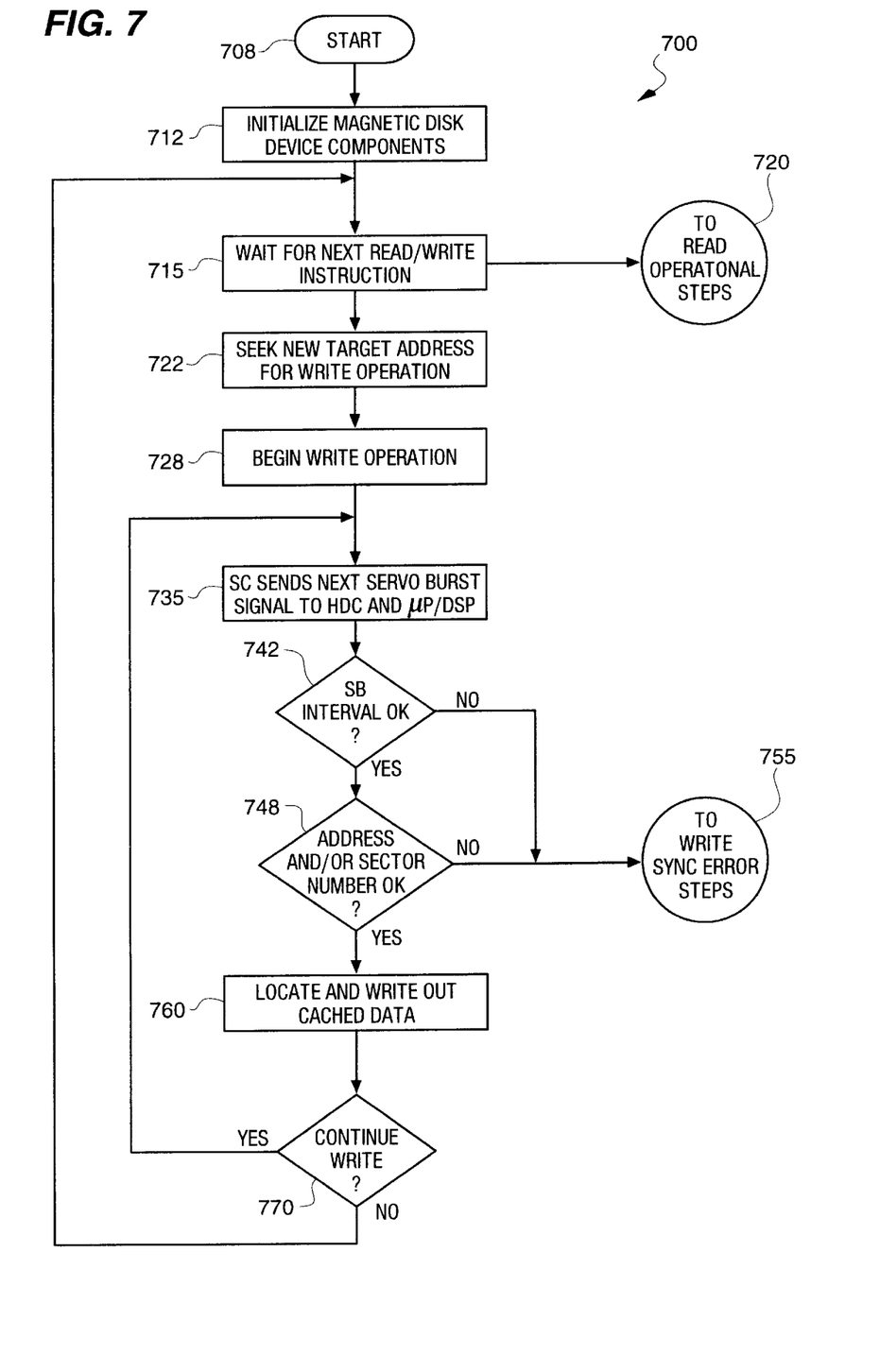
FIG. 7 illustrates write synchronization operational steps in flow diagram form.

Operational Steps—FIG. 7

FIG. 7 illustrates the operational steps 700 for the write synchronization system in flow diagram form. The operational steps 700 begin at step 708 and proceed to step 712 where the disk control components and the operational disk components of a magnetic disk device are initialized and/or powered-up and initialized. Initialization steps include, but are not limited to, verification of an operational and readable magnetic disk, and establishing operational communications between the disk device components.

At step 715, the operational disk control components wait for the next read/write instruction from the microprocessor or DSP. If the instruction is for a read operation then processing continues at point 720 to execute disk read operational steps that are closely related but beyond the scope of the present discussion. If the instruction calls for a write operation then the servo controller begins the process of locating a target data sector for a write operation at step 722. In the mean time the hard disk controller completes its caching of data that will be written to disk at the target address. When the target data sector is located the write operation can begin at step 728.

At step 735 the servo controller sends an encoded servo burst signal to the other disk controller components such as the hard disk controller and the microprocessor or DSP. If at decision step 742 it is determined that the servo burst notification was received within an acceptable time interval for a regularly spaced servo burst, then processing continues at decision step 748. Alternatively, if at decision step 742 it is determined that the servo burst notification was received outside the acceptable servo burst time interval, then processing continues at the write synchronization error handling point 755. Typical write synchronization error handling can include, but is not limited or required to, reinitialize the disk controller components, resynchronize the disk controller components by allowing at least one disk revolution to pass, and/or retry the write operation at the target address.

If at decision step 748 the hard disk controller determines that the encoded servo burst address and/or servo burst number for the present servo burst was not received from the servo controller in the expected sequence, then processing continues to the write synchronization error handling point 755 as previously disclosed. Alternatively, if at decision step 748 it is determined that the encoded signal contents is valid, then the microprocessor or DSP instructs the hard disk controller to locate the appropriate cached data for this write operation and the cached data is written to the disk at step 760. If it is determined at decision step 770 that additional write operations will continue at the present location on the disk then processing continues at step 735. Alternatively, if it is determined at decision step 770 that the present write operation is complete then processing continues at step 715 as previously disclosed.

SUMMARY

The write synchronization system of the present invention includes an encoded signal from the servo controller to the hard disk controller and microprocessor or DSP to facilitate write synchronization between the disk controller components. The encoded signal can be validated against previously received encoded signals and/or based on the time interval between signals to determine if a servo burst has been missed. Although specific embodiments are disclosed herein, it is expected that persons skilled in the art can and will make, use, and/or sell alternative write synchronization systems for use in headerless format magnetic disk devices that are within the scope of the following claims either literally or under the Doctrine of Equivalents.

What is claimed is:

1. A write synchronization system for a disk device having a headerless disk format, said system comprising:

a communication means between a servo controller, a hard disk controller, and a processor;

means for searching for a target location on said disk device;

means for transmitting, from said servo controller to said hard disk controller and said processor, an encoded signal that is indicative of a cylinder, head, and servo burst number of a servo burst on said disk device in response to said means for searching;

means for receiving, from said servo controller to said hard disk controller and said processor, said encoded signal that is indicative of the cylinder, the head, and the servo burst number of the servo burst on said disk device in response to said means for transmitting;

means for comparing a present encoded signal contents that is indicative of said cylinder, head, and servo burst number of said servo burst on said disk device with a previous encoded signal contents that is indicative of said cylinder, head, and servo burst number of a previous servo burst on said disk device by said hard disk controller and said processor;

means for determining if an intervening servo burst was skipped in a sequence of servo bursts in response to said means for comparing by said hard disk controller and said processor;

means for determining an expected time interval between any two neighboring servo bursts on said disk device by said hard disk controller and said processor;

means for timing an interval between an occurrence of a first encoded signal indicative of a first servo burst and an occurrence of a second encoded signal indicative of a second servo burst by said hard disk controller and said processor; and means for writing data to said target location in response to a positive validation of said encoded signal.

2. A system according to claim 1 including:

means for encoding said encoded signal with a binary code.

3. A system according to claim 2 wherein said binary code is phase encoded.

4. A method for synchronizing a plurality of disk control components in a disk device having a disk and a headerless disk format thereon, said method comprising:

establishing a communication link between a first disk control component that reads disk administration information including a cylinder, a head, and a servo burst number from said disk and at lease one other second disk control component of said disk device;

transmitting a signal indicative of said disk administration information from said first disk control component to said at lease one second disk control component;

receiving the signal indicative of said disk administration information from said first disk control component to said at lease one second disk control component;

comparing said disk administration information in said present signal and said disk administration information in at least one preceding signal by said at least one second disk control component;

determining if intervening disk administration information was skipped between an occurrence of said present signal and a most recent one of said at least one preceding signal by said at least one second disk control component;

determining an expected time interval between regularly spaced disk administration information markers on said disk by said at least one second disk control component;

timing an interval between an occurrence of a first signal indicative of a first disk administration information marker and an occurrence of said present signal indicative of a second disk administration information marker that is adjacent to said first disk administration information marker by said at least one second disk control component;

writing cached data to said disk in response to a positive validation of said disk administration information in said signal.

5. A method according to claim 4 wherein said transmitting step includes:

encoding said signal.

6. A method according to claim 4 wherein said transmitting step includes:

encoding said signal with said disk administration information in a binary coded format.

7. A write synchronization system for a plurality of disk control components in a magnetic disk device, said magnetic disk device having a magnetic disk and a headerless disk format thereon, said system comprising:

means for transmitting a signal indicative of disk administration information from a first disk control component to at least one second disk control component;

means for receiving the signal indicative of said disk administration information including a cylinder, a head, and a servo burst number from said first disk control component to said at least one second disk control component;

comparing said disk administration information in said present signal and said disk administration information in at least one preceding signal by at least one of said at least one second disk control component;

determining if intervening disk administration information was skipped between an occurrence of said present signal and one of said at least one preceding signal by at least one of said at least one second disk control component;

determining an expected time interval between regularly spaced disk administration information markers on said magnetic disk by at least one of said at least one second disk control component; and means for timing an interval between an occurrence of said a first signal indicative of a first disk administration information marker and an occurrence of a second signal indicative of a second disk administration information marker that is adjacent to said first disk administration information marker by at least one of said at least one second disk control component.

8. A system according to claim 7 including:

means for writing cached data to said magnetic disk in response to a positive validation of said disk administration information in said signal.

9. A system according to claim 7 wherein said means for transmitting includes:

means for encoding said signal with said disk administration information in a binary coded format; and means for phase encoding said signal.

\* \* \* \* \*